United States Patent [19]

Bushee

[11] 3,977,430

[45] Aug. 31, 1976

[54] BALL CHECK VALVE CONSTRUCTION WITH PRESSURE-RESPONSIVE RESET MEANS

[76] Inventor: Joseph J. Bushee, 36 Purvis St., Watertown, Mass. 02172

[22] Filed: Aug. 22, 1974

[21] Appl. No.: 499,502

[52] U.S. Cl. .............................. 137/460; 137/517
[51] Int. Cl.² ................................... F16K 17/00
[58] Field of Search ............... 137/460, 517, DIG. 2

[56] References Cited
UNITED STATES PATENTS

| | | | |
|---|---|---|---|
| 1,339,383 | 5/1920 | Beese | 137/460 X |
| 2,929,399 | 3/1960 | Magowan | 137/517 X |
| 2,931,178 | 4/1960 | Straus | 137/460 X |
| 3,407,827 | 10/1968 | Follett | 137/460 X |
| 3,779,273 | 12/1973 | Stone | 137/460 |

FOREIGN PATENTS OR APPLICATIONS

| | | | |
|---|---|---|---|
| 70,239 | 10/1927 | Sweden | 137/460 |

Primary Examiner—Harold W. Weakley
Attorney, Agent, or Firm—Munroe H. Hamilton

[57] ABSTRACT

A ball check valve construction provides for safely controlling flow of compressed fluid under a normal operating pressure through a conduit line to a pressure actuated device. The valve construction includes a valve body formed with a ball check chamber in which is contained a ball normally biased by a spring element into an open position. The valve body is constructed with inlet and outlet ports having respective conduit elements connected thereto. Sudden pressure increase through the valve body resulting from an end of a conduit element becoming accidentally disconnected compresses the ball against the spring into contact with a sealing ring surrounding the spring, thereby to instantly interrupt flow of compressed air and prevent whipping or lashing about of the disconnected end. A reset device is arranged in a side wall part of the valve body to quickly move the ball out of contact with the sealing ring into a recess formed internally of the ball chamber, thereby to allow the spring to return the ball to a normally opened spring-biased position. The reset device includes a plunger assembly mounted for transversely reciprocating movement into and out of the ball chamber. The plunger assembly is sealably contained in the side wall of the valve body so as to permit normal operating pressure in the ball check chamber to return the plunger to a retracted position after a reset operation takes place.

1 Claim, 5 Drawing Figures

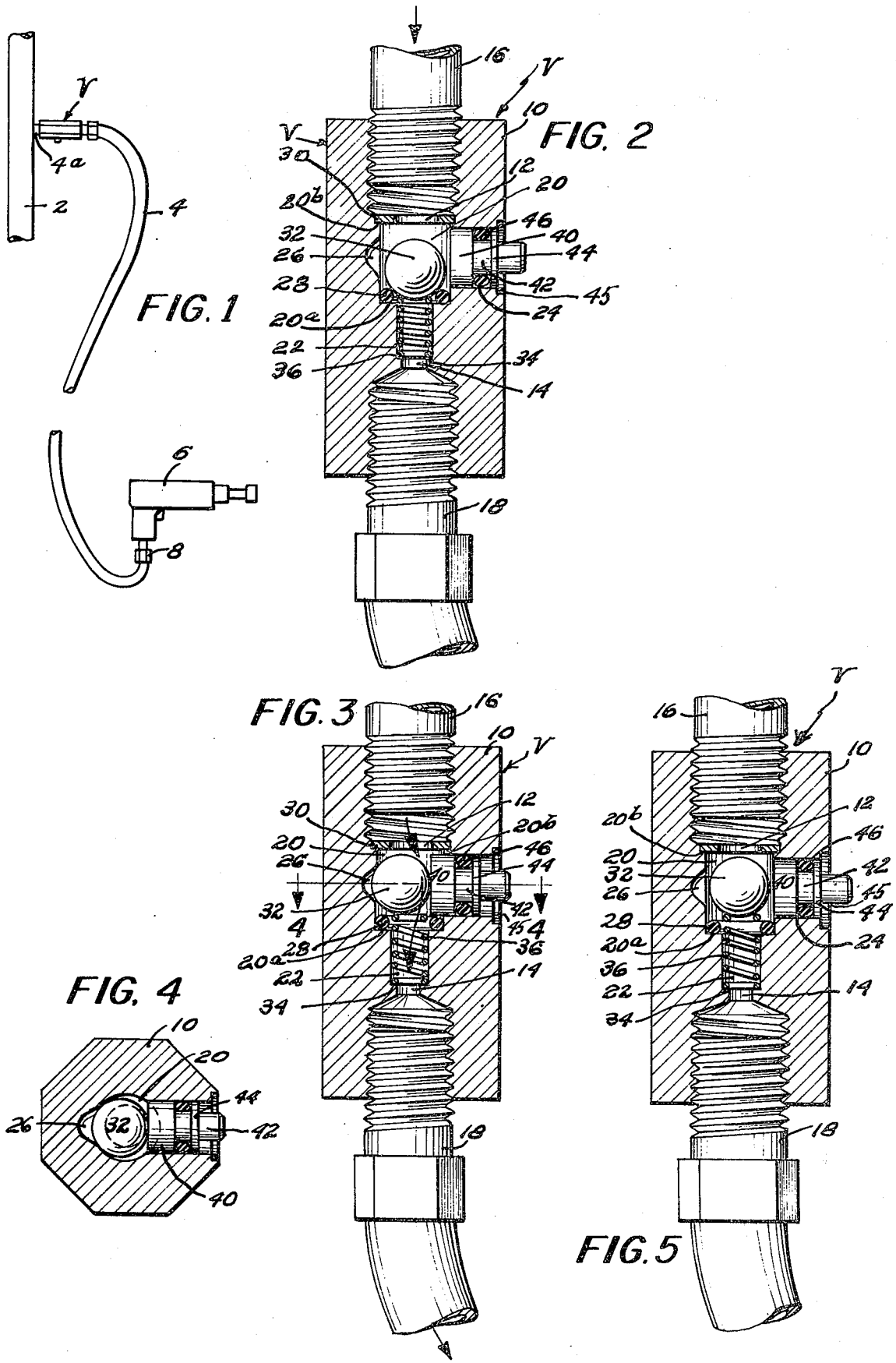

3,977,430

BALL CHECK VALVE CONSTRUCTION WITH PRESSURE-RESPONSIVE RESET MEANS

BACKGROUND OF THE INVENTION

There is now in widespread use a method of supplying compressed air through a flexible conduit line which can be quickly connected at one end to a source of supply of compressed air and at its other end to a pressure actuated device located at some distance from the source of supply. It has been found that accidental disconnecting of the flexible conduit line occurs quite frequently and when this takes place, whipping and lashing about of a disconnected conduit end creates a work hazard which may result in injury to a workman or to equipment.

Although the use of ball checks is well-known in the art, such devices are not being utilized in the type of conduit installation described due to disadvantages of one sort or another which makes their use impractical. Typical of conventional ball check arrangements are those disclosed in U.S. Pat. Nos. 398,111, Abbot, et al; 1,498,477, Nichles; 1,759,798, Murphy et al; 2,274,511, Worthington; 2,368,281, Wittenberg; and 3,335,750, Kepner. None of the disclosed ball check arrangements are practical for the particular usage described above, and they fail to disclose a safety ball check which can be quickly reset without shutting off flow of compressed fluid from the source of supply.

SUMMARY OF THE INVENTION

The present invention provides improved ball check valve construction which can be readily connected into a flexible conduit line for safely controlling flow of compressed air or other compressed fluid in the field of use indicated above.

In thus devising an improved ball check valve construction, a chief objective has been to devise a positive safety control incorporated in a valve body in a manner such that it can operate instantly in the event of a conduit section being accidentally disconnected. It is a further object to provide a reset device combined with the ball check valve in a unique manner which enables an operator to quickly reset the ball check in a normally spring-biased position which allows for flow of air at a predetermined operating pressure. It is still a further object of the invention to provide a reset device which not only can be quickly operated to reset the ball check in an operative position, but which is itself responsive to normal operating pressure to become instantly re-positioned in readiness for another reset operation.

The nature of the invention and its other objects and novel features will be more fully understood and appreciated from the following description of a preferred embodiment of the invention selected for purposes of illustration and shown in the accompanying drawings.

BRIEF DESCRIPTION OF THE DRAWINGS

FIG. 1 is a diagrammatic view illustrating a flexible conduit means for supplying compressed air from a source of supply to a pressure actuated device and indicating the ball check valve means of the invention connected to the conduit line.

FIG. 2 is a fragmentary enlarged view of the conduit flow line illustrating portions of the ball check valve means in cross section in a position to shut off flow of compressed air.

FIG. 3 is another fragmentary view showing the valve means in cross section and also illustrating the ball check being displaced by a reset device.

FIG. 4 is a cross section taken on the line 4—4 of FIG. 3.

FIG. 5 is a view similar to FIGS. 2 and 3 and further illustrating the ball check in its normal spring-biased position, and also indicating the reset device re-positioned for another actuator operation.

DESCRIPTION OF THE PREFERRED EMBODIMENTS OF THE INVENTION

Referring more in detail to the structure shown in the drawings, numeral 2 denotes a source of supply of compressed fluid such as compressed air. A conduit line 4 preferably consisting in a flexible conduit material of conventional nature conducts the compressed air or other fluid under a normal operating pressure to a pressure actuated device 6. The conduit section 4 is provided with a quickly connected fitting 8 which is widely used in the art. Because of the quick attachability feature of fittings of this class, it frequently happens that a fitting may become accidentally disconnected with resulting shipping or lashing about taking place.

In accordance with the invention, I provide an improved safety ball check valve construction which can be connected to the conduit line 4 at any desired point. This safety ball check valve construction is generally indicated by the letter V, and as shown in FIG. 1, is connected to the conduit section 4a at a point closely adjacent to the source of supply of the pressurized fluid, although the ball check may be connected to the conduit line at other points, if desired.

In FIG. 2 the ball check valve assembly is shown in a safety controlling position resulting from an accidental disengagement of the conduit line 4 from the actuating device 6.

In FIG. 3 the check valve assembly is illustrated in a position of displacement into a ball recess.

In FIG. 5, the valve assembly is shown in a fully reset position with the ball in a spring-biased position it assumes under normal operating pressure.

As noted in these FIGS. 3 and 5, the valve assembly comprises an elongated hollow valve body 10 formed with an inlet port 12 and an outlet port 14 in which are threadably engaged respective inlet and outlet conduit sections 16 and 18. At a central section, the valve body is further recessed to provide a ball check chamber 20; a spring cavity 22 extending from one side of the chamber; a cylindrical plunger aperture 24 located transversely through a side wall part of the valve body; and a ball recess 26 formed in a side wall section opposite the plunger aperture.

The ball check chamber 20 is provided at one side with a shoulder 20a against which is snugly received a sealing ring 28. At an opposite end of chamber 20 is a shoulder 20b against which is located an annular ball retaining element 30. Loosely disposed between the sealing ring 28 and the retaining element 30 is a ball check member 32. Supported in the spring cavity 22 against a shouldered part 34 is a coiled spring 36, a projecting end of which is located inside the sealing ring 28 in concentrically spaced relationship. The projecting end of the coiled spring 36 is shaped to form an annular seat which under normal operating pressure in the conduit line resiliently engages against the ball 32 to locate this member in a spring-biased position in spaced relation to the sealing ring 28, thus providing a passageway through which a constant flow of compressed fluid, under the said normal operating pressure can take place.

When this normal operating pressure changes as a result of the connecting part 8 being accidentally disengaged, a sudden surge of compressed fluid in the conduit line instantly forces the ball 32 against the resistance of spring 36 into a sealing position with the sealing ring 28 as illustrated in FIG. 2, and thus safely confines the pressure surge without any appreciable whipping or lashing about of the disconnected conduit occurring, and without having to shut off the flow of compressed fluid at the source of supply.

To open the conduit line and provide flow of fluid under normal operating pressure, I have devised a reset means consisting in a plunger assembly mounted for reciprocating movement in the cylindrical plunger aperture 24. The plunger assembly includes a cylindrical plunger head 40 from which extends a spindle part 42. Secured around the spindle part 42 is a sealing ring 46 and a retaining collar 44. The sealing ring is sealably engaged against the peripheral surface of the cylindrical aperture 24. An outer end of the spindle 42 projects beyond the outer surface of the valve body and is movable through a retaining cap 45 fixed in a recess in the valve body as shown.

It will be observed that the plunger head 40 is located in a position such that it may be moved into the ball check chamber along a path of travel which lies immediately above the sealing ring 28 and which allows the head to come into contact with the ball 32 and displace this member laterally into the ball recess 26, as shown in FIG. 3. This opens the conduit line for flow of air under normal operating pressure which in return relocates the ball 32 on the annular seat of spring 36, as shown in FIG. 5.

Concurrently with flow of fluid under normal operating pressure through the ball check chamber, pressure is exerted against the sealed plunger assembly and the plunger 40 is moved back into a reset position as shown in FIG. 5. It is pointed out that the combination of a plunger and sealing ring assembly makes possible a quick and simple displacement of the ball check to re-establish normal operating pressure and yet the plunger is instantly moved back into its normally retracted position with no further handling by an operator being required.

An important feature of the ball check and plunger assembly resides in the combination of these parts with a tubular valve body in a manner such that removal of the parts may be easily carried out to replace worn or defective elements such as the sealing ring 28 or the spring 36. This is accomplished by unthreading the conduit sections 16 and 18 and moving the valve body into a vertically disposed position in which the retaining element 30, ball 32, sealing ring 28 and spring 36 can all be pushed out and replaced by new parts. Similarly the retaining cap 45 may be pried out and the plunger assembly withdrawn for servicing.

I claim:

1. Safety ball check valve construction for use in controlling flow of compressed air under a normal operating pressure through a conduit line to a pressure actuated apparatus, said valve construction comprising a valve body having an inlet port and an outlet port for detachably receiving respective inlet and outlet sections, the valve body being further recessed to form a ball check chamber, a spring cavity extending therefrom, a ball member loosely contained in the chamber, a sealing ring mounted at one side of the ball chamber, spring means supported in the spring cavity inside the sealing ring in a projecting position to locate the ball in spring-biased spaced relation to the sealing ring when compressed air flow through the valve body is under normal operating pressure, and to resiliently retain the ball when it is moved into sealing relationship with the sealing ring in response to change in pressure of the compressed air, reset means for moving the ball from a sealing position into the said spring-biased spaced relationship to the ring when said normal operating pressure is in effect, and said reset means including a side wall part of the valve body formed with a cylindrical aperture and an opposite side wall section formed with a ball recess, and a plunger device for displacing the ball from a sealing position on the sealing ring into the ball recess.

* * * * *